(12) United States Patent
Fisher

(10) Patent No.: US 7,110,771 B2
(45) Date of Patent: *Sep. 19, 2006

(54) METHOD FOR IMPLEMENTING FAST-DYNAMIC CHANNEL ALLOCATION CALL ADMISSION CONTROL FOR RADIO LINK RECONFIGURATION IN RADIO RESOURCE MANAGEMENT

(75) Inventor: Xiaochun Xu Fisher, E. Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 187 days.

This patent is subject to a terminal disclaimer.

(21) Appl. No.: 10/750,135

(22) Filed: Dec. 31, 2003

(65) Prior Publication Data

US 2005/0026623 A1 Feb. 3, 2005

Related U.S. Application Data

(60) Provisional application No. 60/463,893, filed on Apr. 17, 2003.

(51) Int. Cl.
*H04Q 7/20* (2006.01)
(52) U.S. Cl. ............... 455/452.1; 455/452.2; 455/450; 370/328; 370/332; 370/458
(58) Field of Classification Search ............... 455/450, 455/451, 452.1, 452.2, 412.1, 414.1, 464, 455/509, 512, 513, 63.1, 67.11, 67.13; 370/230, 370/235, 280, 241.1, 331, 335, 337, 328, 370/345, 329
See application file for complete search history.

(56) References Cited

U.S. PATENT DOCUMENTS

| 5,359,596 | A | 10/1994 | Sadiq |
| 6,473,442 | B1* | 10/2002 | Lundsjo et al. ............. 370/537 |
| 6,487,415 | B1* | 11/2002 | Eibling et al. .............. 455/453 |
| 6,791,961 | B1* | 9/2004 | Zeira et al. ................. 370/335 |
| 2001/0036823 | A1 | 11/2001 | Van Lieshout et al. |
| 2002/0003782 | A1* | 1/2002 | Pan et al. .................... 370/280 |
| 2002/0009061 | A1 | 1/2002 | Willenegger |
| 2002/0094817 | A1 | 7/2002 | Rune et al. |
| 2002/0119783 | A1 | 8/2002 | Bourlas et al. |
| 2002/0119796 | A1 | 8/2002 | Vanghi |
| 2003/0123388 | A1* | 7/2003 | Bradd ......................... 370/230 |
| 2004/0214582 | A1* | 10/2004 | Lan et al. ................. 455/452.2 |
| 2005/0148337 | A1* | 7/2005 | Karlsson et al. ............ 455/453 |
| 2005/0190729 | A1* | 9/2005 | Roy et al. .................... 370/336 |

* cited by examiner

*Primary Examiner*—Jean Gelin
(74) *Attorney, Agent, or Firm*—Volpe and Koenig, P.C.

(57) ABSTRACT

A method of implementing fast dynamic channel allocation call admission control for radio link reconfiguration in a wireless communication system includes a pre-code allocation procedure, a signal-independent code allocation procedure, and a post-code allocation procedure. The pre-code allocation procedure receives and processes a request message and retrieves system measurements and wireless transmit/receive unit (WTRU) capability information from a centralized database. A list of available timeslots and a list of code sets is retrieved from the centralized database. The code sets are allocated to the available timeslots, wherein a successful assignment is a solution. The solution having the lowest weighted interference signal code power is an optimal solution. The WTRU information with new allocation information is updated in the centralized database. A radio link reconfiguration ready message with the results of the code allocation process is then sent.

32 Claims, 7 Drawing Sheets

METHOD FOR IMPLEMENTING FAST-DYNAMIC CHANNEL ALLOCATION CALL ADMISSION CONTROL FOR RADIO LINK RECONFIGURATION IN RADIO RESOURCE MANAGEMENT

CROSS REFERENCE TO RELATED APPLICATIONS

This application claims priority from U.S. Provisional Application No. 60/463,893, filed Apr. 17, 2003, which is incorporated by reference as if fully set forth herein.

FIELD OF THE INVENTION

The present invention relates generally to radio resource management in wireless communication systems, and more particularly to a fast dynamic channel allocation (F-DCA) call admission control (CAC) algorithm for radio link (RL) reconfiguration in radio resource management (RRM).

BACKGROUND OF THE INVENTION

In wireless communication systems, RRM is generally responsible for utilizing the air interface resources. RRM is used to guarantee quality of service (QoS), to provide efficient use of the radio resources, and to increase system capacity. RRM consists of admission control, handover, power control, and congestion control functionalities. Admission control can be divided into user admission control and call admission control (CAC). User admission control accepts or rejects the radio resource control (RRC) connection requested by a wireless transmit/receive unit (WTRU). CAC accepts or rejects a request to establish or modify a radio access bearer (RAB) in the radio access network (RAN). CAC is located in the controlling radio network controller (C-RNC).

Dynamic channel allocation (DCA) is used to meet the ever increasing cellular traffic demand. There are two DCA functions, slow DCA (S-DCA) and fast DCA (F-DCA). The S-DCA allocates the radio resources to cells, while the F-DCA allocates the radio resources to bearer service. The F-DCA CAC functions are responsible for efficiently allocating or changing the allocations of physical resources. When a request for physical resources is received, the CAC will accept or reject the request based on the availability of physical resources and interference level in the cell. The request can be accepted only if both uplink and downlink CAC admit it. Otherwise, the request is rejected.

For time division duplex (TDD) mode, the radio link setup procedure is used to establish the necessary radio resources for a new radio link related to real time (RT) or non real time (NRT) services. After the radio link is set up, the radio link reconfiguration procedure is used to add, modify, or delete any physical resources for this existing radio link. The F-DCA CAC algorithm is invoked upon receiving the request messages.

In order to guarantee the QoS and minimize the interference, a certain F-DCA CAC algorithm has been currently implemented. But the previous implementation of the F-DCA CAC algorithm has several limitations. One limitation is that it is difficult to be reused by other RRM functions since the main interface function is large, and the inputs to the code allocation function (which forms the core function of the F-DCA CAC algorithm), are dependent on the signal message. A second limitation is that the past implementation of the F-DCA CAC algorithm is generally only suitable for RT service.

It is desirable to provide an optimized implementation of the F-DCA CAC algorithm for radio link reconfiguration which is suitable for RT and NRT service, and which overcomes the disadvantages of the known algorithms.

SUMMARY OF THE INVENTION

The present invention improves and optimizes the known F-DCA CAC algorithm implementation by modularizing/ categorizing the functionality of the F-DCA CAC algorithm and making the inputs to the core functions of this algorithm independent of signal messages. The invention is described in the context of layer 3 in a time-division duplex (TDD) scenario, but is applicable without limitation to other modes of transmission as well. The modularized functions of the present invention can be reused by other RRM algorithms in future RRM implementations in both real time (RT) service and non-real time (NRT) service.

The present invention provides an implementation of the F-DCA CAC algorithm for radio link reconfiguration procedure in RRM. The inventive method modularizes the F-DCA CAC algorithm for radio link reconfiguration into three processes: pre-code allocation, code allocation, and post-code allocation. The functions in both the pre-code allocation process and the post-code allocation process are signal-dependent while the functions in code allocation process are signal-independent.

The pre-code allocation process is used to describe how and where to retrieve the information from a radio link reconfiguration prepare message, RRM cell database and WTRU database, and how to prepare the required inputs for the code allocation process. The post-code allocation process is used to determine what information should be stored in the RRM cell database and the WTRU database, and what information should be provided to a radio link reconfiguration ready message.

A method of implementing F-DCA CAC for radio link reconfiguration in a wireless communication system includes a pre-code allocation process, a signal-independent code allocation process, and a post-code allocation process. The precode allocation process includes receiving and processing a request message, and retrieving system information from a centralized database. The code allocation process includes checking the availability of a code set in the cell; generating timeslot sequences; assigning a code set to the available timeslots in a timeslot sequence, wherein a successful assignment is a solution; calculating the interference signal code power (ISCP) for each solution; and selecting the solution having the lowest weighted ISCP as an optimal solution. The post-code allocation process includes storing allocation information in a centralized database and creating a response message.

A method for fast dynamic channel allocation call admission control (CAC) for radio link reconfiguration in a wireless communication system begins by receiving a request message to initiate the CAC function. The request message is processed and a list of available timeslots and a list of code sets is retrieved from a centralized database. The code sets are allocated to the available timeslots and the allocation information is stored in the centralized database. A response message with the results of the code allocation process is then sent.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF PREFERRED EMBODIMENT

Figure 1:
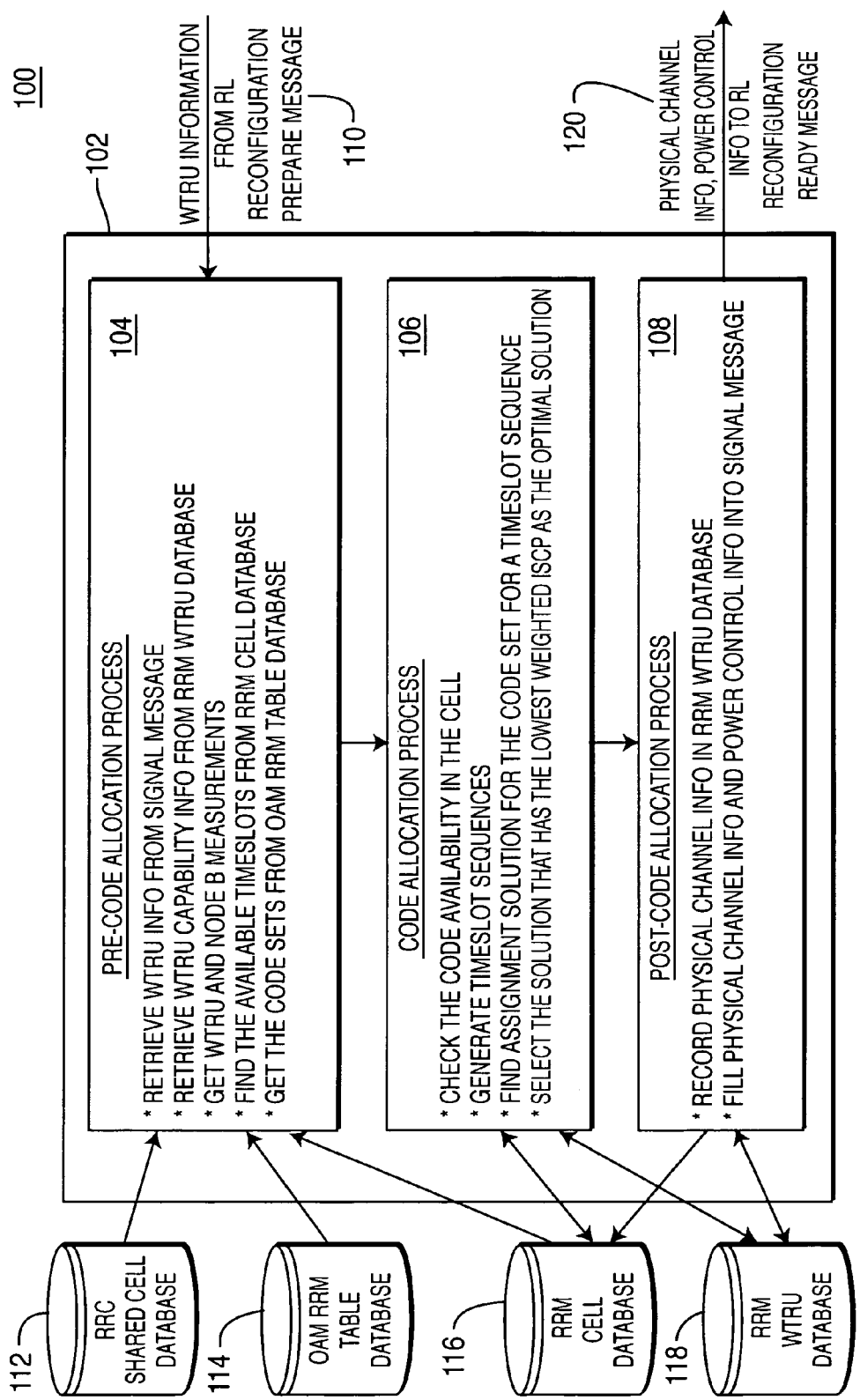
FIG. 1 is an overview of a F-DCA CAC procedure for radio link reconfiguration.

An overview 100 of the F-DCA CAC procedure for radio link reconfiguration 102 is shown in FIG. 1. The F-DCA CAC procedure 102 consists of three parts: a pre-code allocation process 104, a code allocation process 106, and a post-code allocation process 108. The pre-code allocation process 104 retrieves WTRU information from a radio link reconfiguration prepare message 110 and retrieves WTRU capability information from a RRM WTRU database 118. WTRU and Node B measurements are retrieved from a RRC shared cell database 112. A list of the available timeslots is obtained from a RRM cell database 116 and code sets are retrieved from an operations and maintenance (OAM) RRM table database 114.

The code allocation process 106 checks the code availability in the cell, generates timeslot sequences, finds the optimal solution for the code set (assigns the codes in the code sets to the available timeslots and allocates the channelized codes from the code vectors in the RRM cell database 116). The post-code allocation process 108 updates code vector information in the RRM cell database 116, records the allocated physical channels in the RRM WTRU database 118, and records the physical channel parameters and power control information in a radio link reconfiguration ready message 120.

In addition to the data exchanges between the processes and the database, there are data exchanges occurring directly between the processes. The WTRU measurements, the Node B measurements, a list of available timeslots in the cell, a list of code sets for the specific data rate, and WTRU capability information are passed from the pre-code allocation process 104 to the code allocation process 106. The physical channel information (a list of timeslots and channelized codes in each timeslot) is passed from the code allocation process 106 to the post-code allocation process 108.

In the present invention, the functions of the F-DCA CAC procedure for radio link reconfiguration 102 are modularized into two groups of functions: signal-dependent functions whose inputs are parts of signal messages and signal-independent functions whose inputs are independent of signal messages. The purpose of separating the signal-dependent functions and the signal-independent functions is to increase the reusability of the signal-independent functions. The functions of both the pre-code allocation process 104 and the post-code allocation process 108 are signal-dependent functions. In contrast, the functions of the code allocation process 106 are signal-independent functions. It is to be noted that the functions of the code allocation process 106 can be reused by other procedures in other RRM function implementations.

The flowcharts for functions of the F-DCA CAC procedure for radio link reconfiguration are shown in FIGS. 2 through 4b.

Figure 2:
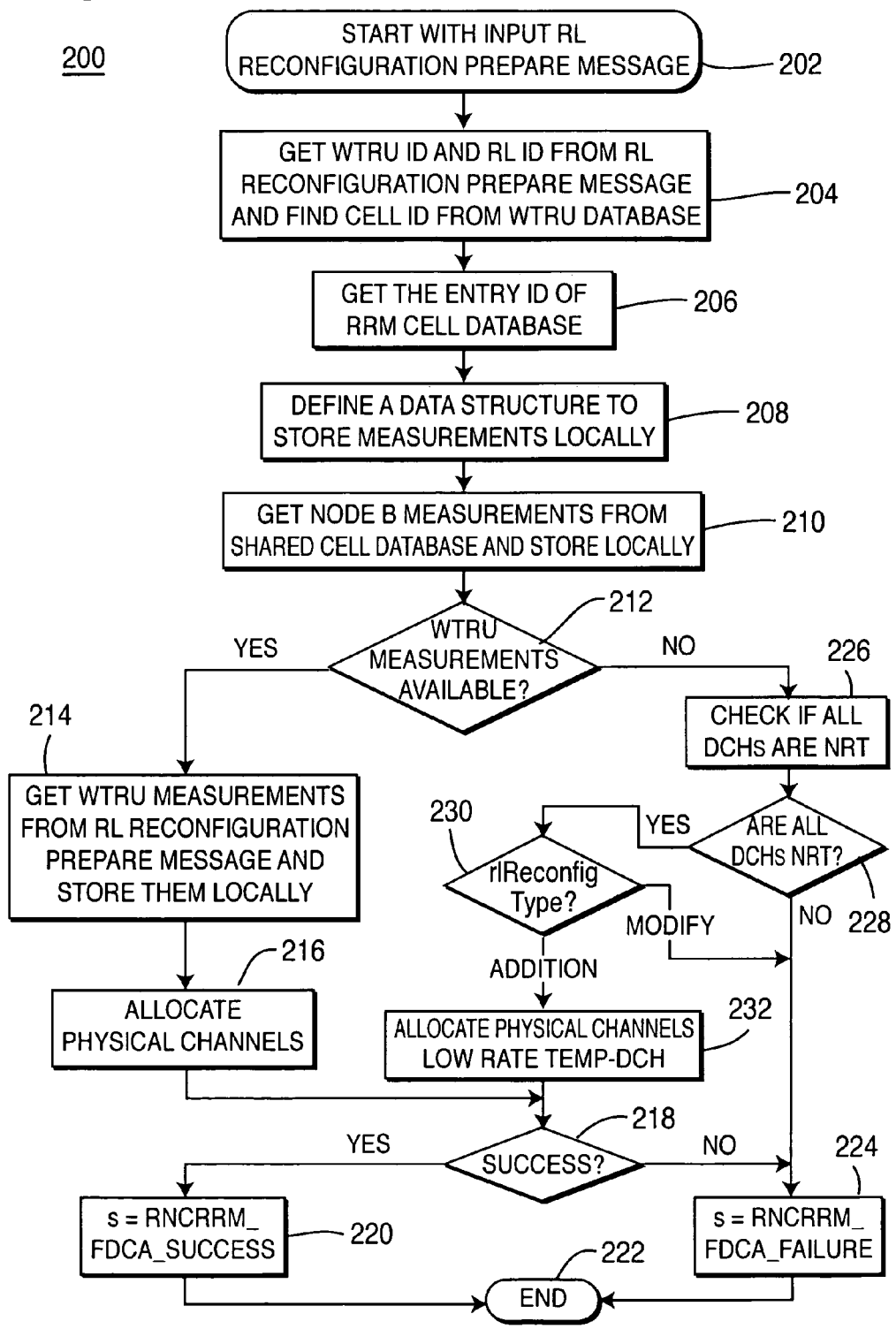
FIG. 2 is a flowchart of the F-DCA CAC procedure for radio link reconfiguration shown in FIG. 1.

FIG. 2 shows a flowchart of the main interface procedure 200 of the F-DCA CAC for radio link reconfiguration procedure. The procedure 200 begins by obtaining the RL reconfiguration prepare message (referred to hereinafter as "prepare message"; step 202). The prepare message contains coded composite transport channel (CCTrCH) information (about a CCTrCH to be added or modified), dedicated channel (DCH) information (about a DCH to be added or modified), and radio link (RL) information with or without WTRU measurements. The WTRU measurements include the downlink interference signal code power (DL ISCP) and the downlink primary common control physical channel received signal code power (DL P-CCPCH RSCP). The WTRU identification and the RL identification are extracted from the prepare message and the cell identification is retrieved from the WTRU database (step 204). The entry identification of the RRM cell database is then obtained (step 206).

A data structure is created to store measurements locally (step 208). This measurement data structure is stored in the F-DCA CAC function dynamically. It is created after the F-DCA CAC function is called and is deleted when the F-DCA CAC function is exited. The Node B measurements are then retrieved from the RRC shared cell database and are stored locally (step 210). The Node B measurements include common measurements and dedicated measurements. The Node B common measurements include the UL ISCP and the DL transmitted carrier power. The Node B dedicated measurements include the DL transmitted code power.

The measurement data structure includes a list of cell measurement records. A cell measurement record includes the cell identification and a list of timeslot measurement records. A timeslot measurement record contains the timeslot number, the timeslot interference signal code power (ISCP), the timeslot carrier power, and a list of code measurement records. A code measurement record consists of the WTRU identification, the radio link identification, the dedicated physical channel (DPCH) identification, and the code transmitted power.

If the WTRU measurements are included in the prepare message (step 212), then the WTRU measurements are extracted from the prepare message and are stored locally in the measurement data structure (step 214). The physical channels are then allocated for the CCTrCHs to be added or modified (step 216). It is noted that the code allocation procedure (step 216) is the same, whether CCTrCHs are to be added or modified. The channel allocation procedure will be discussed in greater detail in connection with FIGS. 3a–3c, below. If the physical channel allocation is a success (step 218), then a status flag is set to indicate the success condition (step 220) and the procedure terminates (step 222). If the channel allocation is not successful (step 218), then the status flag is set to indicate a failure condition (step 224) and the procedure terminates (step 222).

If the WTRU measurements are not included in the prepare message (step 212), then a determination is made whether all of the dedicated channels (DCHs) are NRT (step 226). If all the DCHs are not NRT, then this indicates a failure condition, and the status flag is set to indicate the failure condition (step 224) and the procedure terminates (step 222). If all the DCHs are NRT (step 228), then the RL reconfiguration type is determined (step 230). The RL configuration type is set based upon the CCTrCH in the RL. If the CCTrCH is to be added, then the RL configuration type is set to "ADDITION." If the CCTrCH is to be modified, then the RL configuration type is set to "MODIFY."

If the RL reconfiguration type is "MODIFY", then this indicates a failure condition, and the status flag is set to indicate the failure condition (step 224) and the procedure terminates (step 222). The failure condition indicates that there is not enough information to process the request further. The failure condition is reached when the RL configuration type is "MODIFY" and the RL reconfiguration message does not include the WTRU measurements.

If the RL reconfiguration type is "ADDITION" (step 230), then the low rate temporary DCHs are allocated for the CCTrCHs to be added (step 232). The procedure then continues with step 218, as described above.

Figure 3A:
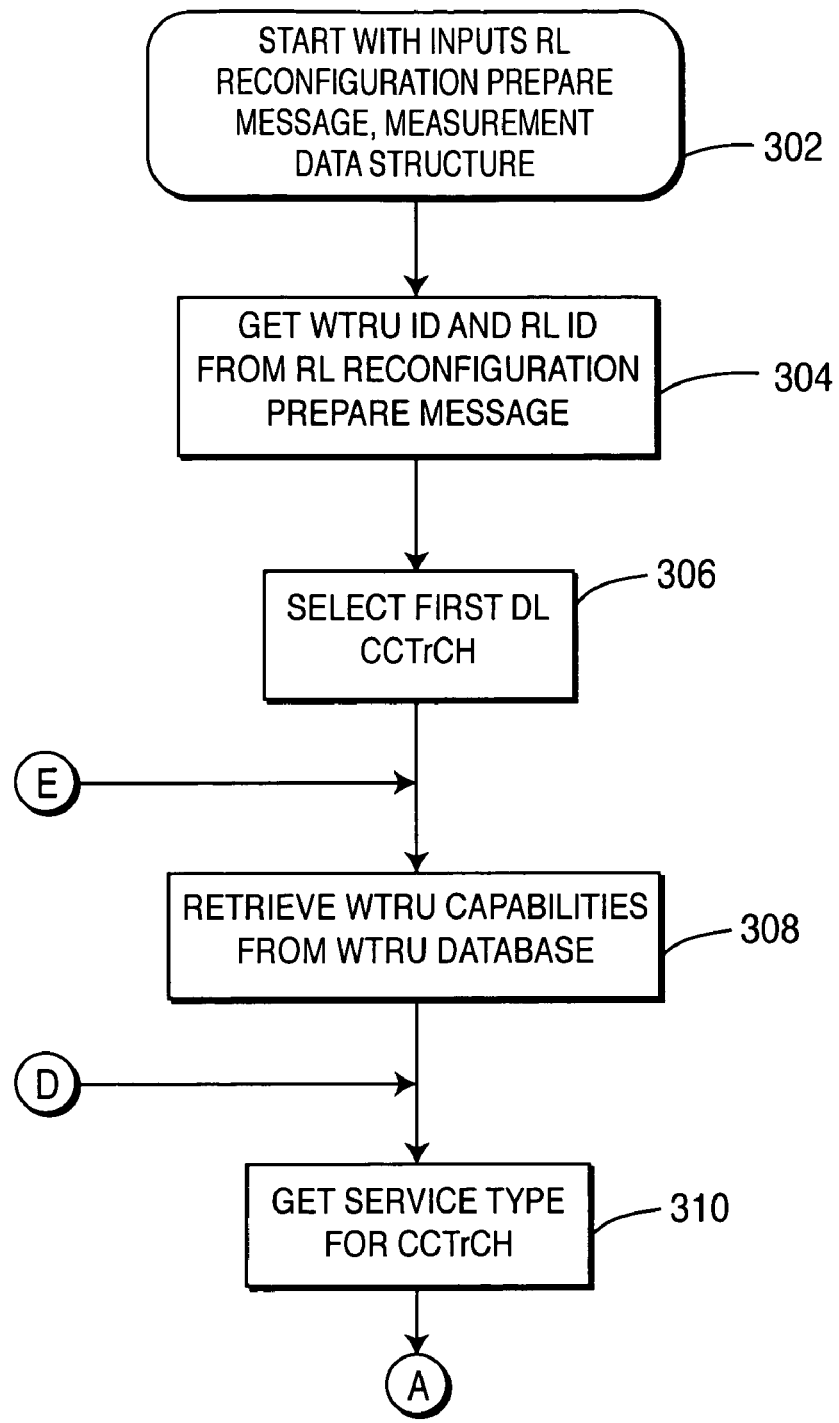
FIGS. 3a–3c are a flowchart of a physical channel allocation procedure of the F-DCA CAC procedure for radio link reconfiguration shown in FIG. 2.
Figure 3B:
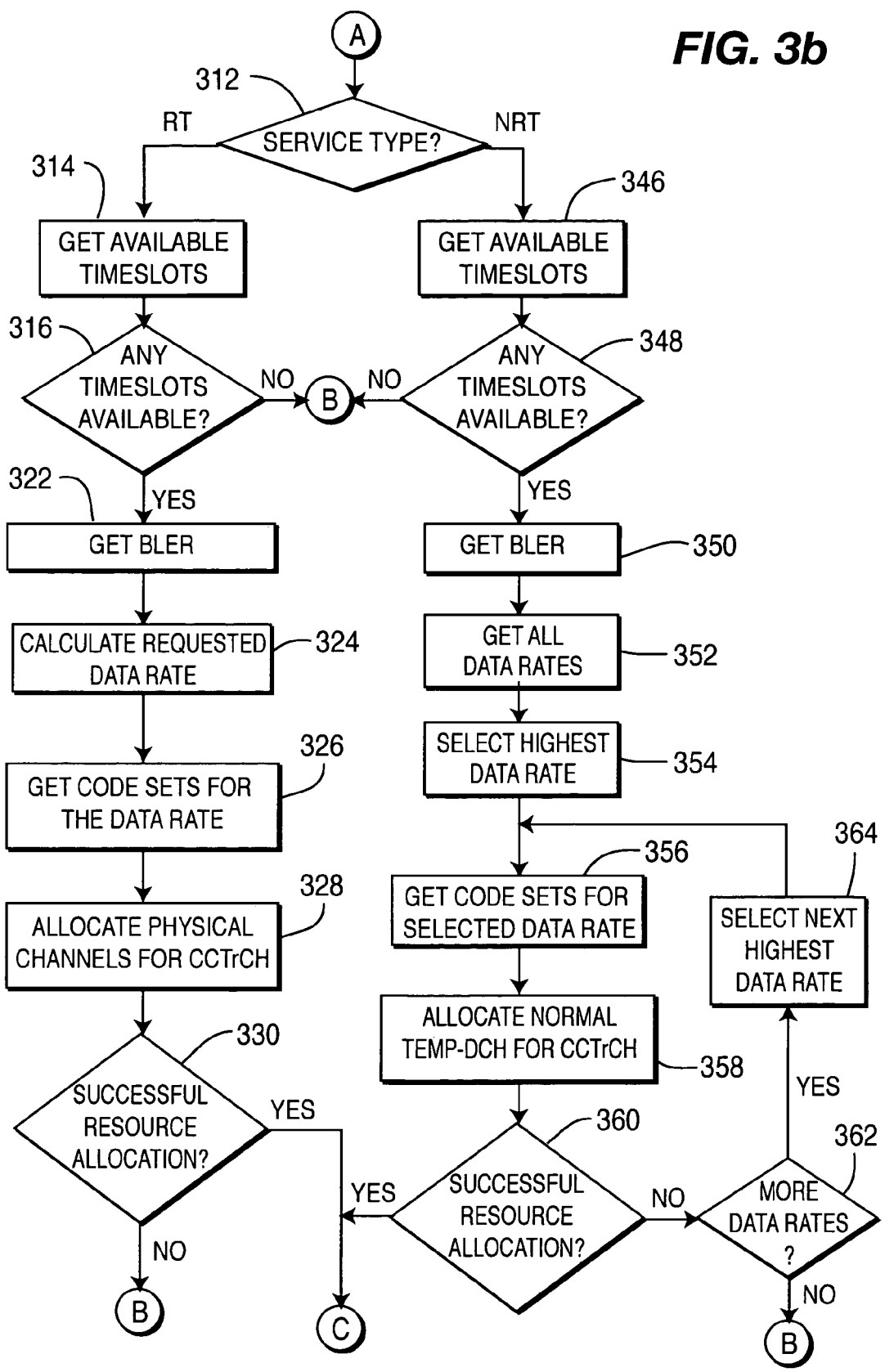
Figure 3C:
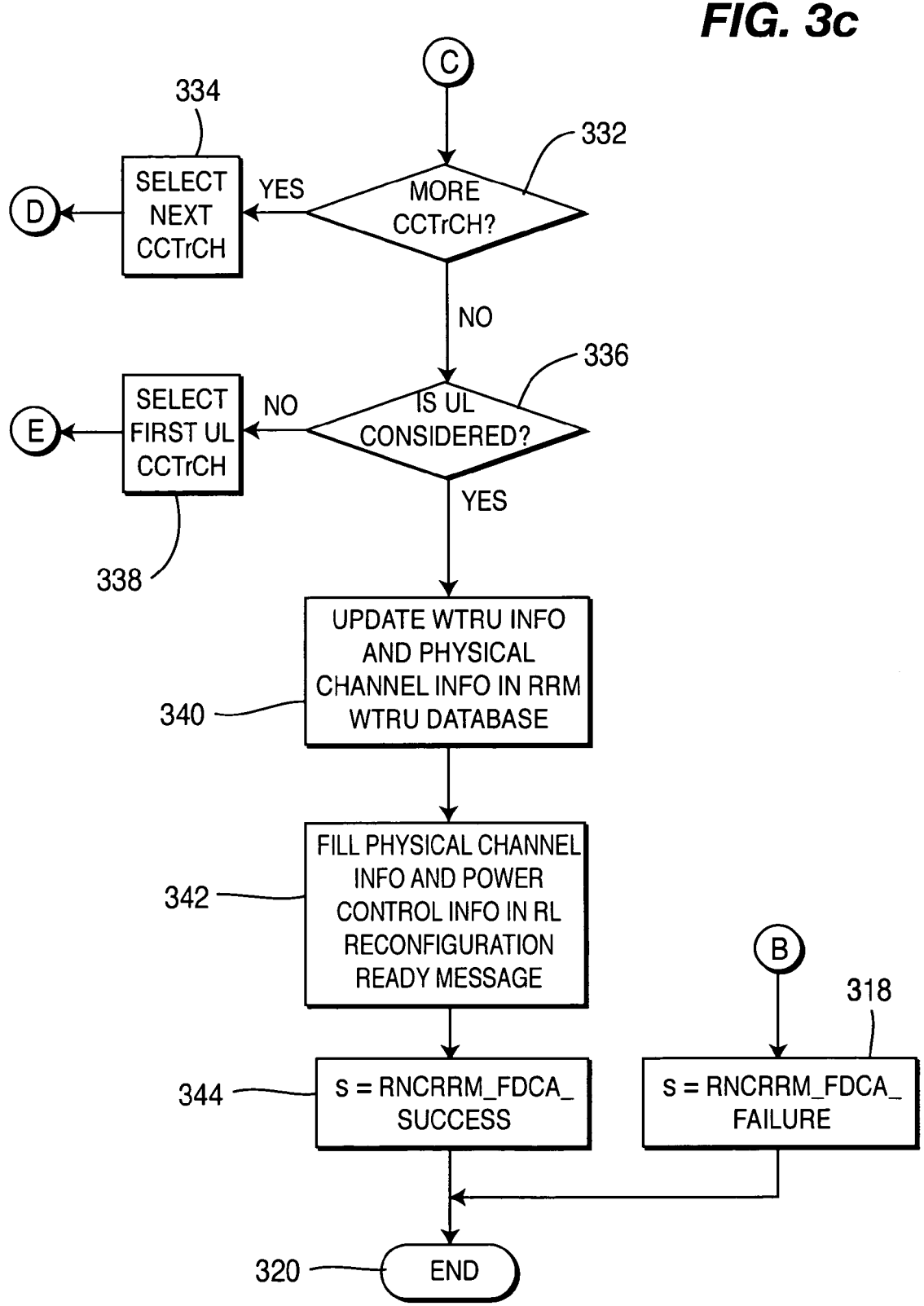
Figure 4A:
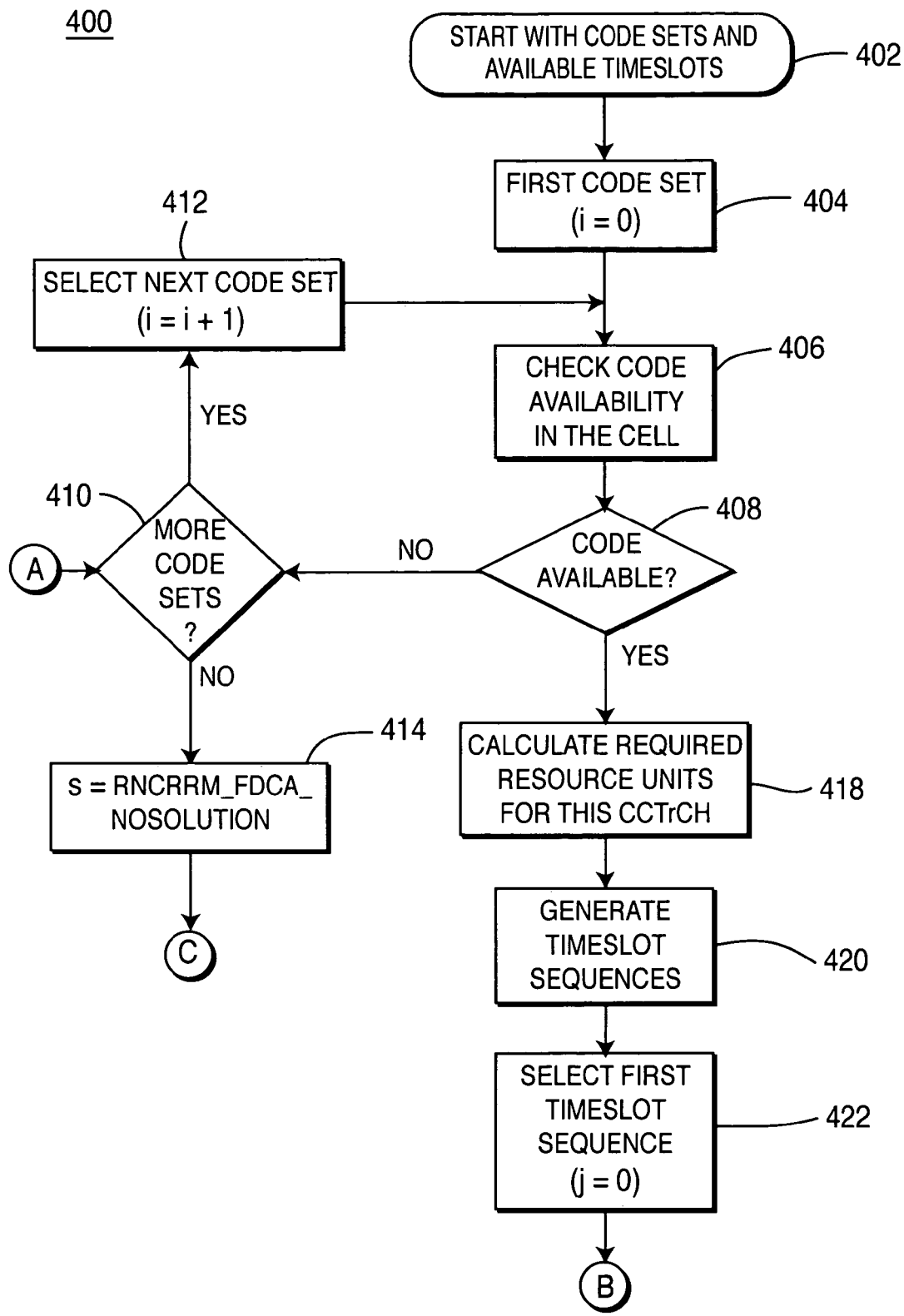
FIGS. 4a–4b are a flowchart of a function to allocate physical channels to a coded composite transport channel (CCTrCH).
Figure 4B:
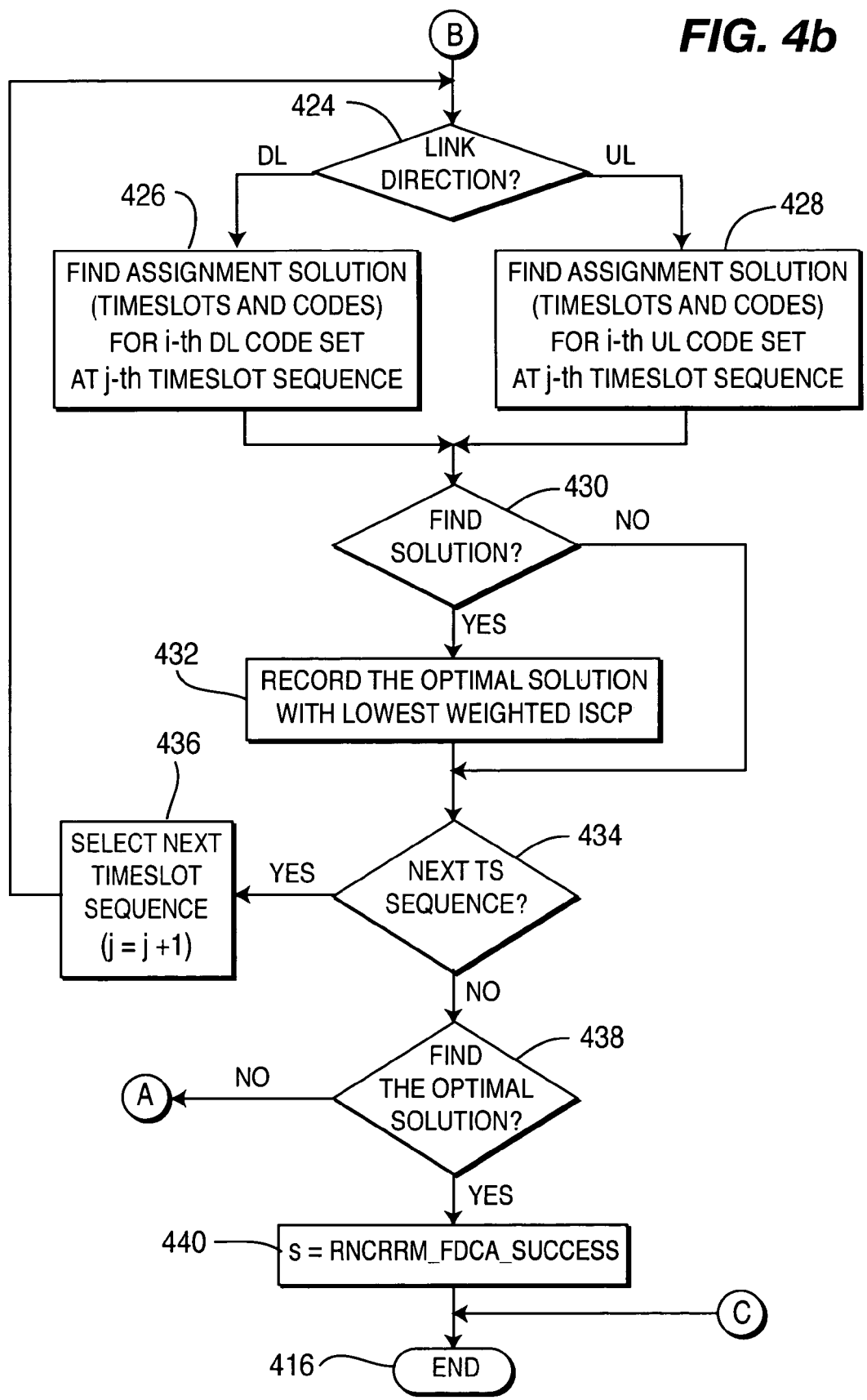

FIGS. 3a–3c show a flowchart of a channel allocation procedure 300, which is used by step 216 of the F-DCA CAC RL reconfiguration procedure 200. The procedure 300 begins by obtaining the prepare message (step 302) and extracting the WTRU identification and the RL identification from the prepare message (step 304).

The first DL CCTrCH is selected (step 306) and the WTRU capabilities are retrieved from the WTRU database (step 308). The service type for the selected CCTrCH is obtained (step 310), and if the service type is RT (step 312), then the available timeslots for the RT in the cell are determined (step 314). If no timeslots are available (step 316), this indicates a failure condition, and a status flag is set to indicate the failure condition (step 318) and the procedure terminates (step 320).

If there are timeslots available (step 316), then the block error rate (BLER) for the selected CCTrCH is determined (step 322) and the requested data rate is calculated (step 324). The code sets for the calculated data rate are obtained (step 326) and the physical channels (timeslots and codes) for the selected CCTrCH are allocated and the optimal solution is recorded if found (step 328). The allocation function in step 328 is discussed in greater detail below in connection with FIGS. 4a and 4b. If the resource allocation was not successful (step 330), then the status flag is set to indicate a failure condition (step 318) and the function terminates (step 320).

If the resource allocation was successful (step 330), then a determination is made whether there are additional CCTrCHs in the current direction (i.e., DL or UL) to be examined (step 332). If there are additional CCTrCHs to be examined, then the next CCTrCH in the current direction is selected (step 334) and the procedure continues at step 310. If there are no additional CCTrCHs to be examined (step 332), then a determination is made whether the uplink (UL) CCTrCHs have been examined (step 336). If the UL CCTrCHs have not been examined, then the first UL CCTrCH is selected (step 338) and the procedure continues at step 308. If all of the UL CCTrCHs have been considered (step 336), then the WTRU information and the physical channel information are updated in the RRM WTRU database, and the code vector information is updated in the RRM cell database (step 340).

The updated WTRU information includes both the UL CCTrCH information (for a CCTrCH to be added or modified) and the DL CCTrCH information (for a CCTrCH to be added or modified) with newly allocated physical channel information. The CCTrCH information includes the CCTrCH identification, the CCTrCH status, the CCTrCH signal to interference (SIR) target, the guaranteed data rate, the allowed data rate, and the dedicated physical channel (DPCH) information. The DPCH information includes a list of DPCH timeslot information, a repetition period, and a repetition length. The DPCH timeslot information includes the timeslot number, the midamble shift and burst type, the transport format code indicator (TFCI) presence, and a list of code information. The code information includes the channelized code, the code usage status, the DPCH identification, and the code SIR target. The code vector information includes the UL code vector information and the DL code vector information. The UL code vector information includes a code identification, a code block indication, and a code usage status. The DL code vector information includes a code identification and a code usage status.

The physical channel information and the power control information are then put into a RL reconfiguration ready message (step 342), the status flag is set to indicate a successful resource allocation (step 344), and the procedure terminates (step 320). The physical channel information includes a list of timeslot information, a repetition period and a repetition length. The timeslot information includes the timeslot number, the midamble shift and burst type, the transport format code indicator (TFCI) presence, and a list of code information. The code information includes the channelized code and the DPCH identification. The power control information includes the initial DL transmission power, the maximum DL transmission power, the minimum DL transmission power, the maximum UL SIR and the minimum UL SIR. In one implementation of the present invention, a single data structure is used for both the request message and the response message since these two messages include a lot of common information.

If the service type for the selected CCTrCH is NRT (step 312), then the available timeslots for the NRT in the cell are determined (step 346). If no timeslots are available (step 348), the status flag is set to indicate a failure condition (step 318) and the procedure terminates (step 320). If there are timeslots available (step 348), then the BLER for the selected CCTrCH is determined (step 350). All data rates suitable for the NRT service are determined (step 352) and the highest data rate is selected (step 354). The code sets for the selected data rate are obtained (step 356) and the normal temporary DCHs for the selected CCTrCH are allocated and the optimal solution is recorded if found (step 358). It is noted that steps 328 and 358 are essentially the same; in NRT service, the DCHs are temporary.

If the resource allocation was not successful (step 360), then a determination is made whether there are additional data rates to be examined (step 362). If there are no other data rates to be examined, then the status flag is set to indicate a failure condition (step 318) and the procedure terminates (step 320). If there are other data rates to be examined (step 362), then the next highest data rate is selected (step 364) and the procedure continues at step 356. If the resource allocation was successful (step 360), then the procedure continues at step 332 as described above.

It is noted that in connection with steps 306, 336, and 338 that either direction (DL or UL) can be performed first. As described above, the DL direction is examined prior to the UL direction. The procedure 300 will operate in the same manner if instead the UL was examined prior to the DL.

The steps 328 and 358 relate to calling the core function of the F-DCA CAC algorithm to allocate the channels. This core function 400 is signal-independent and is described in connection with FIGS. 4a and 4b. The function 400 begins by receiving the code sets, the available timeslots, WTRU capability information, and the measurement data structure as inputs (step 402). As described above, the measurement data structure includes both WTRU measurements and Node B measurements. The first code set is selected (step 404) and a determination is made whether the code set is available in the cell (steps 406 and 408). If the selected code set is not available in the cell, then a determination is made whether there are more code sets to be examined (step 410). If there are more code sets, then the next code set is selected (step 412) and the function continues with step 406. If there are no more code sets, this indicates a failure condition, and a status flag is set to indicate that no solution is available (step 414) and the function terminates (step 416).

If the selected code set is available in the cell (step 408), then the required resource units for the code set in the CCTrCH are calculated (step 418). The timeslot sequences for the available timeslots are generated (step 420) and the first timeslot sequence is selected (step 422). The link direction, either downlink (DL) or uplink (UL), is then determined (step 424). If the link direction is DL, then an attempt is made to assign the current DL code set into the available timeslots in the current timeslot sequence (step 426). If the link direction is UL (step 424), then an attempt is made to assign the current UL code set into the available timeslots in the current timeslot sequence (step 428). In an alternate embodiment of the present invention (not shown), step 424 can be eliminated and steps 426 and 428 can be combined into a single step, to provide additional optimization.

After an attempt has been made to assign the current code set to the current timeslot sequence (steps 426, 428), a determination is made whether an assignment solution has been found (step 430), indicating that the code set was successfully assigned to the available timeslots in the timeslot sequence. If a solution has been found, then the interference signal code power (ISCP) of the solution is determined, and the solution having the lowest weighted ISCP is considered to be the optimal solution and is recorded (step 432). If no solution was found (step 430), then step 432 is skipped.

Next, a determination is made whether there are any additional timeslot sequences to be considered (step 434). If there are additional timeslot sequences, then the next timeslot sequence is selected (step 436) and the function continues with step 424. If there are no additional timeslot sequences (step 434), then a determination is made whether an optimal solution has been found (step 438). If no optimal solution has been found, then the function continues with step 410. If the optimal solution has been found, then the status flag is set to indicate a successful assignment (step 440) and the function terminates (step 416).

In previous implementations of F-DCA CAC, the procedures 426 and 428 are signal-dependent. In the present invention, these two procedures are modified to become signal-independent. All related functions used in these procedures are also modified to become signal-independent. Because the inputs of the functions 426 and 428 are independent of the signal message (such as the RL reconfiguration prepare message), the function 400 can be used by other RRM procedures.

It is noted that the above-described implementation of the F-DCA CAC algorithm is exemplary and can be further optimized by converting other functions to become signal-independent. For example, as discussed above, the steps 426 and 428 can be combined into a single step, and step 424 can be eliminated. Although the preferred embodiments are described in conjunction with a third generation partnership program (3GPP) wideband code division multiple access (W-CDMA) system utilizing the time division duplex (TDD) mode, the embodiments are applicable to any hybrid code division multiple access (CDMA)/time division multiple access (TDMA) communication system. Additionally, some embodiments are applicable to CDMA systems, in general, using beamforming, such as the proposed frequency division duplex (FDD) mode of 3GPP W-CDMA. While specific embodiments of the present invention have been shown and described, many modifications and variations could be made by one skilled in the art without departing from the scope of the invention. The above description serves to illustrate and not limit the particular invention in any way.

What is claimed is:

1. A method of implementing a fast dynamic channel allocation call admission control for radio link reconfiguration in a wireless communication system, comprising:
    a pre-code allocation process;
    a signal-independent code allocation process, including:
        checking the availability of a code set in the cell;
        generating timeslot sequences for the available timeslots;
        assigning a code set to the available timeslots in a timeslot sequence, wherein a successful assignment is a solution;
        calculating the interference signal code power (ISCP) for each solution; and
        selecting the solution having the lowest weighted ISCP as an optimal solution; and
    a post-code allocation process.

2. The method according to claim 1, wherein the pre-code allocation process includes:
    receiving a request message;
    processing the request message; and
    retrieving system information from a centralized database.

3. The method according to claim 2, wherein the processing the request message step includes:
    reading wireless transmit/receive unit (WTRU) measurements from the request message; and
    reading WTRU coded composite transport channel information and dedicated channel information from the request message.

4. The method according to claim 2, wherein the retrieving step includes:
    retrieving wireless transmit/receive unit (WTRU) capability information;
    retrieving Node B measurements from the centralized database;
    retrieving a list of available timeslots from the centralized database; and
    retrieving a list of code sets from the centralized database.

5. The method according to claim 1, wherein the post-code allocation process includes:
    updating wireless transmit/receive unit (WTRU) information in a centralized database; and
    creating a response message.

6. The method according to claim 5, wherein the updating step includes recording new coded composite transport channel (CCTrCH) information and associated physical channel allocation information in the centralized database.

7. The method according to claim 5, wherein the creating step includes
    adding power control information to the response message; and
    adding physical channel allocation information to the response message.

8. A method of implementing fast dynamic channel allocation call admission control (CAC) for radio link reconfiguration in a wireless communication system, comprising the steps of:
receiving a radio link reconfiguration request message to initiate the CAC function;
processing the request message;
obtaining Node B measurements from a centralized database;
defining a local data structure to store measurement data;
retrieving a list of available timeslots and a list of code sets from the centralized database;
retrieving wireless transmit/receive unit (WTRU) capability information from the centralized database;
allocating the code sets to the available timeslots in a timeslot sequence;
updating the new WTRU information with new allocation information in the centralized database; and
sending a response message with the results of the code allocation process.

9. The method according to claim 8, wherein the processing step includes reading WTRU information, WTRU coded composite transport channel information, and dedicated channel information from the request message.

10. The method according to claim 8, wherein the processing step includes reading WTRU measurements from the request message.

11. The method according to claim 10, wherein the WTRU measurements include:
the downlink interference signal code power; and
the downlink primary common control physical channel received signal code power.

12. The method according to claim 8, wherein the retrieving step further includes reading Node B measurements from the centralized database.

13. The method according to claim 12, wherein the Node B measurements include:
common measurements, including uplink interference signal code power and downlink transmitted carrier power; and
dedicated measurements, including downlink transmitted code power.

14. The method according to claim 8, wherein the local data structure includes a list of cell measurement records.

15. The method according to claim 14, wherein a cell measurement record includes:
a cell identification; and
a list of timeslot measurement records.

16. The method according to claim 15, wherein a timeslot measurement record includes:
a timeslot number;
a timeslot interference signal code power (ISCP);
a timeslot carrier power; and
a list of code measurement records.

17. The method according to claim 16, wherein a code measurement record includes:
a WTRU identification; and
a radio link identification;
a dedicated physical channel (DPCH) identification; and
a code transmitted power.

18. The method according to claim 8, wherein the WTRU capability information includes:
uplink WTRU capability information, including:
the maximum number of timeslots per frame; and
the maximum number of uplink physical channels per timeslot; and
downlink WTRU capability information, including:
the maximum number of time slots per frame; and
the maximum number of downlink physical channels per frame.

19. The method according to claim 8, wherein the allocating step includes:
checking the availability of a code in the cell;
generating timeslot sequences from the list of available timeslots; and
assigning a code set to a timeslot sequence to find a solution, wherein a successful assignment is a solution.

20. The method according to claim 19, wherein the allocating step further includes:
calculating an interference signal code power (ISCP) value for the solution; and
selecting the solution having the lowest weighted ISCP value as an optimal solution.

21. The method according to claim 8, wherein the updating step includes:
recording coded composite transport channel (CCTrCH) information in the centralized database;
recording new physical channel allocation information in the centralized database; and
updating code vector information in the centralized database.

22. The method according to claim 21, wherein the CCTrCH information includes:
a CCTrCH identification;
a CCTrCH status;
a CCTrCH signal to interference ratio target;
a guaranteed data rate;
an allowed data rate; and
the dedicated physical channel (DPCH) information.

23. The method according to claim 22, wherein the DPCH information includes:
a list of DPCH timeslot information;
a repetition period value; and
a repetition length value.

24. The method according to claim 23, wherein the DPCH timeslot information includes:
a timeslot number;
a midamble shift and burst type;
a transport format combination indicator presence; and
code information.

25. The method according to claim 24, wherein the code information includes:
a channelization code;
a code usage status;
dedicated physical channel identification; and
a code signal to interference target.

26. The method according to claim 21, wherein the code vector information includes:
an uplink code vector information, including:
a code identification;
a code block indication;
a code usage status; and
a downlink code vector information, including:
a code identification; and
a code usage status.

27. The method according to claim 8, wherein the sending step includes filling the response message with power control information and physical channel allocation information.

28. The method according to claim 27, wherein the power control information includes:
an initial downlink (DL) transmission power;
a maximum DL transmission power;

a minimum DL transmission power;
a maximum uplink (UL) SIR; and
a minimum UL SIR.

29. The method according to claim 27, wherein the physical channel information includes:
the dedicated physical channel (DPCH) information;
a repetition period value, and
a repetition length value.

30. The method according to claim 29, wherein the DPCH information includes DPCH timeslot information.

31. The method according to claim 30, wherein the DPCH timeslot information includes:
the timeslot number;
the midamble shift and burst type;
the transport format combination indicator presence; and
a list of code information.

32. The method according to claim 31, wherein the code information includes:
the DPCH identification; and
the channelization code.

* * * * *

UNITED STATES PATENT AND TRADEMARK OFFICE
CERTIFICATE OF CORRECTION

PATENT NO.         : 7,110,771 B2                                Page 1 of 1
APPLICATION NO. : 10/750135
DATED              : September 19, 2006
INVENTOR(S)        : Xiaochum Xu Fisher It is certified that error appears in the above-identified patent and that said Letters Patent is hereby corrected as shown below:

At column 3, line 8, after the word "are", delete "a flowchart" and insert therefor --flowcharts--.

At column 3, line 11, after the word "are", delete "a flowchart" and insert therefor --flowcharts--.

At column 3, line 25, after the word "from", delete "a" and insert therefor --an--.

At column 3, line 26, after the word "from", delete "a" and insert therefor --an--.

At column 3, line 28, after the word "from", delete "a" and insert therefor --an--.

At column 5, line 15, after the word "show", delete "a flowchart" and insert therefor --flowcharts--.

At column 6, line 13, after the word "into", delete "a" and insert therefor --an--.

At claim 17, column 9, line 58, after the word "identification;", delete "and".

Signed and Sealed this

Fifteenth Day of July, 2008

JON W. DUDAS
*Director of the United States Patent and Trademark Office*